United States Patent Office 3,373,965
Patented Mar. 19, 1968

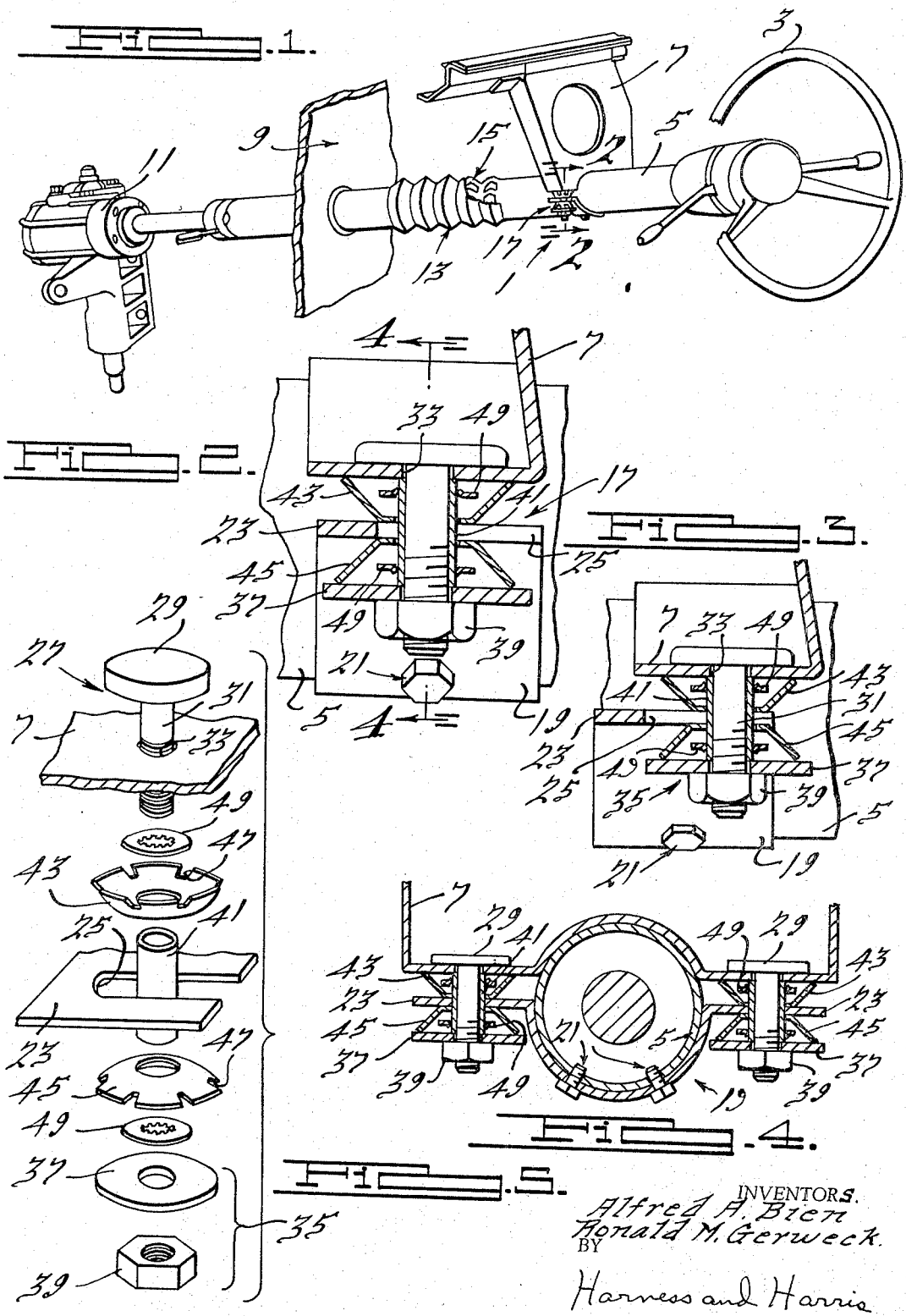

3,373,965
RELEASABLE STEERING COLUMN CLAMP
Alfred A. Bien, Birmingham, and Ronald M. Gerweck, Royal Oak, Mich., assignors to Chrysler Corporation, Highland Park, Mich., a corporation of Delaware
Filed June 8, 1966, Ser. No. 556,096
16 Claims. (Cl. 248—226)

This invention relates to steering wheel mounting assemblies, and more particularly to a clamp for releasably connecting a steering wheel column to the instrument panel or the like of a vehicle.

Many energy-absorbing steering wheel and column assemblies are presently available in the automotive field. Certain of these assemblies include means in the steering column which, in the event of a severe front-end collision, permit the column to be displaced, or shortened at a controlled rate, from the force of impact applied at either end of the column.

The steering column must be connected to the instrument panel or dashboard in such a manner that, upon impact on the steering wheel, the column and instrument panel separate to permit the column to be displaced. On the other hand, if the force of impact is applied to the lower end of the column, it is important that the column and instrument panel do not separate and cause the column to be forced toward the driver.

One type of mounting for a steering column includes a plurality of molded plastic slugs or pins which join the steering column to members connected to the instrument panel. These slugs are injected in plastic form into aligned cavities in the column assembly and the members connected to the instrument panel during the assembly of the mounting. This process of attachment requires considerable manual dexterity and is relatively time consuming.

It is a primary object of this invention to provide a clamp for connecting a steering wheel column to an instrument panel, the clamp being adapted to release the column from the panel upon the application of a predetermined force on the steering wheel.

Another object of this invention is to provide a clamp of the type described which tends to prevent the upper portion of the column from being thrust into the driving compartment upon the application of force on the lower end of the steering column.

A further object of this invention is to provide a clamp such as described which is adapted to exert a predetermined frictional grip on a bracket connected to a steering column to permit the bracket to be slipped from the clamp when an impact force is exerted on the steering wheel.

A further object of the invention is the provision of a clamp of the type described which permits the steering column to be moved laterally relative to itself after a certain minimum amount of axial movement has taken place.

Another object of this invention is to provide a clamp such as described which is easy to assemble and which facilitates the connection of the steering column to the instrument panel, thus reducing the manual dexterity required for and time consumed during connection of the steering column to the instrument panel.

A further object of this invention is the provision of a clamp of the class described which is relatively inexpensive, simple in construction, and effective in operation.

Other objects of this invention will become apparent as the description progresses.

In the accompanying drawings, in which one of various possible embodiments of this invention is illustrated:

FIG. 1 is a perspective view of a steering mechanism utilizing a clamp of this invention;

FIG. 2 is an enlarged section taken along lines 2—2 of FIG. 1;

FIG. 3 is a view similar to FIG. 2 on a slightly reduced scale, illustrating the withdrawal of a steering column connected bracket from the clamp;

FIG. 4 is a section taken along lines 4—4 of FIG. 2; and

FIG. 5 is an expanded view of a portion of the clamp illustrated in FIGS. 1–4.

Like parts are illustrated by corresponding reference characters throughout the several views of the drawings.

Referring now to the drawings, a collapsible steering assembly is generally indicated at 1 in FIG. 1. Assembly 1 includes a steering wheel 3 mounted on the upper end of a steering column 5. Column 5 extends downward past an instrument panel 7 and through a cowl or firewall 9 to a steering sector 11.

Steering column 5 is provided with a deformable or yieldable portion 13 which is adapted to be progressively compressed for absorbing energy from an impact either on the lower end of the steering column 5 or upon the steering wheel 3. As shown here, but not by way of limitation, portion 13 is in the form of an compressible expanded metal or mesh section 15.

The column 5 is connected to the instrument panel 7 by a clamp 17 of this invention. Clamp 17 includes a bracket 19 secured to steering column 5 as indicated at 21. The bracket has preformed side extensions or wing portions 23 extending laterally from opposite sides of column 5. Each wing portion 23 is provided with an elongated slot 25 extending in a direction substantially parallel with the axis of column 5 and opening at the back or rearward edge of the respective wing portion. The means for fastening the bracket 19 to the instrument panel 7 are identical on both sides of the column and a description of the elements on one side will suffice for both.

A fastener or bolt 27 having a head 29 and a shank 31 extends through an aperture 33 in the instrument panel and through the slot 25 in the respective wing portion 23. A backing unit 35, comprising a washer 37 and nut 39 is threaded on the outer end of the shank 31 of the respective bolt. A tubular spacer 41 surrounds shank 31 and extends from instrument panel 7 to washer 37 through slot 25 in the respective wing portion 23. The width of the slots or openings 25 is slightly larger than the outside diameter of the tubular spacers 41 for accommodating the latter. The spacer limits the minimum distance between the washer 37 and the instrument panel 7.

A pair of saucer-shaped springs 43 and 45 are slidably mounted on spacer 41 between the instrument panel 7 and the wing portion 23, and between the washer 37 and the wing portion 23, respectively. The base of each of these springs frictionally engages the respective wing portion 23 and the rim of each spring is slotted as indicated at 47 so as to provide fingers engaging the instrument panel 7 or washer 37.

The springs 43 and 45 may be maintained on spacer 41 during assembly of the clamp by placing retainers 49 outside the springs after the latter have been slipped on spacer 41.

The length of spacer 41 will determine the frictional gripping force exerted by any particular set of springs 43 and 45 on the respective bracket wing portion 23. For example, if the spacer 41 shown in FIG. 4 were shortened, and the nut 39 tightened to take up the decrease in length of spacer 41, the springs 43 and 45 will each be compressed, over the compression shown in FIG. 4, by a distance equal to approximately one half of the decrease in length of spacer 41. Thus, the gripping force exerted by the springs is proportional to the length of the spacer. Therefore, substantially the same gripping force may be obtained for all similar sets of springs by using spacers of the same length. To obtain uniformity of gripping force, it is only necessary that the nut 39 and washer 37 be drawn up tightly against one end of the spacer 41.

The operation of the clamp of this invention is as follows:

Assume first that the lower portion of steering column 5 is connected to cowl 9 in such a manner that such portion can slide from left to right through the cowl as viewed in FIG. 1, but is prevented from sliding from right to left in the same figure.

In the event of a severe front end collision, the portion 13 will deform due to the impact force applied up the column from the lower end thereof and due to the impact of the driver against the steering wheel. The gripping force exerted on the bracket wing portions 23 by the springs 43 and 45 on both sides of the column tend to prevent removal of the bracket therefrom. However, when the force on the column 5 which is exerted by the driver upon striking the steering wheel 3 is sufficient to overcome the resistance of portion 13 and the frictional resistance on bracket 19, the upper portion of column 5 and bracket 19 move downwardly in a generally axial direction, causing the wing portions 23 to slip out of the springs 43 and 45. The upper portion of the column 5 is then free for continued movement, not only in an axial direction, but also in a lateral direction.

The column 5 and steering wheel 3 are prevented from movement into the driver compartment upon the application of an impact force on the front or lower end of the column 5 and steering sector 11 by the engagement of the end of the slots 25 in wing portions 23 with the tubular spacers 41. The displacement of the steering column under the last-mentioned impact conditions takes place in the portion 13 and the lower end of the column 5.

The physical dimensions of the spacer 41 and springs 43 and 45 may be selected to give any desirable resistance to slipping of the bracket from the clamp. It has been found that selecting spacers and springs necessary to withstand slipping under a force of approximately 200 lbs. is advantageous, i.e., each set of springs on the clamp is adapted to hold the bracket against slipping when the forces exerted on the steering wheel end of the column are less than 100 lbs. per spring set. When the force on each set of springs exceeds approximately 100 lbs. the bracket slips from the spring grip. This amount of frictional grip prevents a driver from inadvertently forcing the column from the clamp, yet is small enough so that a force on the steering wheel slightly larger than the force necessary to deform portion 13 causes the bracket 19 to slip out of the clamp.

It will thus be seen that the clamp of this invention permits the upper portion of the steering column 5 and the steering wheel 3 to be moved forwardly and downwardly relative to the instrument panel 7 when the frictional gripping force on the bracket is overcome by the application of force on the column 5 and steering wheel 3 by the driver. Moreover, the gripping force exerted by the springs may be maintained substantially consistent and uniform during automobile assembly operations by utilizing a spacer of pre-determined length in the clamps.

It will also be noted that the clamp of this invention tends to prevent the column 5 and wheel 3 from being thrust into the driver compartment. Moreover, the clamp may be quickly and easily assembled to obtain the pre-determined gripping force.

In view of the foregoing, it will be seen that the several objects and other advantages are obtained.

The particulars of the foregoing description are provided merely for proposes of illustration and are subject to considerable latitude of modification without departing from the novel teachings disclosed herein. Accordingly, the scope of the invention is intended to be limited only as defined in the appended claims and equivalent thereof.

We claim:

1. A clamp for frictionally securing an elongate member to a support means comprising preformed portions on said member adapted to receive fasteners, each of said preformed portions having an opening therethrough extending to one edge thereof, fasteners adapted to extend through said support means and said openings for securing said member to said support means, at least one of said fasteners including a frictional clamp for exerting a predetermined frictional gripping force on said preformed portions adjacent at least one of said openings, said preformed portions being adapted to slip out of said frictional clamp for releasing said member when the frictional gripping force is overcome by a force on said member.

2. A clamp as set forth in claim 1 including a bracket adapted to be connected to said member, said preformed portions comprising wing portions on said bracket.

3. A clamp as set forth in claim 1 wherein one of said fasteners includes a bolt adapted to extend through the support means and said one opening, a backing unit on the outer end of said bolt, said frictional clamp including a spacer adapted to extend from said support means through said one opening to said backing unit, and at least one spring adapted to extend between said preformed portions and one of said means.

4. A clamp as set forth in claim 3 wherein said spring is saucer-shaped and has a central opening, said spring being adapted to surround said spacer.

5. A clamp as set forth in claim 1 wherein one of said fasteners includes a bolt adapted to extend through the support means and said one opening, a backing unit on the outer end of said bolt, said frictional clamp including a spacer adapted to extend from said support means through said one opening to said backing unit, and a pair of springs, one of said springs being adapted to extend around said spacer between said support means and the respective preformed portion, the other spring being adapted to extend around said spacer between said backing unit and the respective preformed portion.

6. A clamp as set forth in claim 1 wherein one of said fasteners includes a bolt adapted to extend through the support means and said one opening, a backing unit on the outer end of said bolt, said frictional clamp including a spacer adapted to surround said bolt and extend between said support means and said backing unit, said spacer limiting the minimum distance between said support means and said backing unit, a pair of saucer-shaped springs adapted to surround said spacer, one of said springs being adapted to extend between the support means and the respective preformed portion and the other spring being adapted to extend between said backing unit and the respective preformed portion for frictionally gripping said preformed portions.

7. A clamp as set forth in claim 6 further comprising retainers adapted to surround said spacer and maintain said springs on said spacer during assembly of said clamp.

8. A clamp for frictionally securing a steering column to a support comprising preformed wing portions extending laterally from said column, each of said wing portions having an opening therethrough extending to one edge thereof in a direction generally parallel to the axis of the column, a pair of fastening means extending through the support and said openings for securing said wing portions to the support, each of said fastening means including clamp means for exerting a predetermined frictional gripping force on the respective wing portion adjacent the respective opening, said wing portions being adapted to slip out of said clamp means to release said column when the frictional gripping force thereon is overcome by the application of force on said column.

9. A clamp as set forth in claim 8 wherein each of said fastening means includes a bolt having a head on one end and a shank extending from said head to the other end, a backing unit on said other end of said bolt, each of said clamp means including a spacer extending from said support to said backing unit, surrounding said bolt and passing through the respective opening, and a pair of springs, one of which extends between said backing unit and the respective wing portion and the other of which extends between the support and respective wing portion, said springs frictionally gripping said wing portions therebetween.

10. A clamp as set forth in claim 9 wherein each of said springs is saucer-shaped and has an opening therein through which the respective spacer passes, the rim portions of said springs being slotted for providing resilient fingers.

11. A clamp as set forth in claim 9 further comprising retainers surrounding each spacer and adapted to hold the springs on the spacer adjacent said wing portions during assembly of said clamp.

12. A clamp as set forth in claim 8 wherein said fastening means comprises a pair of bolts extending through the support and respective openings in said wing portions, said bolts having backing units on the outer ends thereof, each clamp means including a tubular spacer surrounding the respective bolt and extending from said support to the respective backing unit, each of said spacers limiting the minimum distance between said support and the respective backing unit, a pair of saucer-shaped springs surrounding each spacer, one of said springs being located between the support and the respective wing portion, the other spring being located between the respective backing unit and the respective wing portion, the rims of said springs being slotted and engaging the support and the associated backing unit, respectively, and frictionally gripping said wing portions therebetween.

13. A clamp as set forth in claim 12 including a bracket extending around the lower peripheral portion of the column and connected thereto, said preformed wing portions comprising side extension members on said bracket.

14. A clamp as set forth in claim 9 wherein said openings comprise slots having a width slightly larger than the outside diameter of said spacers.

15. A clamp as set forth in claim 13 further comprising retainers surrounding each spacer and adapted to hold the springs on the spacer adjacent said wing portions during assembly of said clamp.

16. A clamp as set forth in claim 12 wherein said openings comprise slots having a width slightly larger than the outside diameter of said tubular spacers.

References Cited
UNITED STATES PATENTS

| | | | |
|---|---|---|---|
| 2,227,821 | 1/1941 | Burrell | 74—493 |
| 2,549,925 | 4/1951 | Paton | 74—493 |
| 2,937,881 | 5/1960 | Norrie | 280—87 |
| 3,078,945 | 2/1963 | Frey | 180—82 |

ROY D. FRAZIER, *Primary Examiner.*

J. FRANKLIN FOSS, *Assistant Examiner.*